US011893062B2

(12) United States Patent
Emminghaus et al.

(10) Patent No.: US 11,893,062 B2
(45) Date of Patent: Feb. 6, 2024

(54) BULK LAZY LOADING OF STRUCTURED DATA

(71) Applicant: SAP SE, Walldorf (DE)

(72) Inventors: Frank Emminghaus, Muehlhausen (DE); Wendeng Li, Shanghai (CN); Zhijie Ai, Shanghai (CN)

(73) Assignee: SAP SE, Walldorf (DE)

( * ) Notice: Subject to any disclaimer, the term of this patent is extended or adjusted under 35 U.S.C. 154(b) by 495 days.

(21) Appl. No.: 16/412,022

(22) Filed: May 14, 2019

(65) Prior Publication Data

US 2020/0364272 A1 Nov. 19, 2020

(51) Int. Cl.
*G06F 16/90* (2019.01)
*G06F 16/903* (2019.01)
*G06F 16/185* (2019.01)
*G06F 16/9038* (2019.01)
*G06F 16/9035* (2019.01)
*G06F 16/901* (2019.01)

(52) U.S. Cl.
CPC ...... *G06F 16/90335* (2019.01); *G06F 16/185* (2019.01); *G06F 16/901* (2019.01); *G06F 16/9035* (2019.01); *G06F 16/9038* (2019.01)

(58) Field of Classification Search
CPC .................................................. G06F 16/90335
USPC .......................................................... 707/828
See application file for complete search history.

(56) References Cited

U.S. PATENT DOCUMENTS

| 6,085,193 A * | 7/2000 | Malkin | G06F 16/9574 |
|---|---|---|---|
| 2003/0163439 A1* | 8/2003 | Hankin | G06F 16/289 |
| 2010/0293332 A1* | 11/2010 | Krishnaprasad | G06F 16/9014 |
| | | | 711/119 |
| 2013/0046794 A1* | 2/2013 | De Magalhaes | G06F 16/9027 |
| | | | 707/797 |
| 2013/0198652 A1* | 8/2013 | Dunn | G06F 3/0484 |
| | | | 715/751 |
| 2013/0282751 A1* | 10/2013 | Lagerblad | G06F 16/258 |
| | | | 707/769 |
| 2017/0300482 A1* | 10/2017 | Gopalakrishnan | G06F 9/453 |

* cited by examiner

*Primary Examiner* — Syling Yen
(74) *Attorney, Agent, or Firm* — Klarquist Sparkman, LLP (57) ABSTRACT

Technologies described herein can be used for the bulk lazy loading of structured data from a database. A request can be received to initialize an application data structure (such as a structured data object, a hierarchical data structure, an object graph, etc.). The data structure can be analyzed to identify a plurality of child objects of the data structure. Database records associated with the plurality of child objects can then be identified. A loaded child record table can be inspected to determine which of the identified database records are not stored in a cache. A request can be generated, comprising one or more queries to retrieve the uncached subset of database records from the database. Once the uncached subset of records are received from the database, these records can be used, along with the cached subset of the identified database records, to initialize the plurality of child objects of the application data structure.

20 Claims, 8 Drawing Sheets

DATA LOAD REQUEST 410

411 T2 T3
413 T1 T2
415 T1 T2
417 T1 T3

LOADED CHILD RECORD TABLE 420

| KEY | TABLE 1 | TABLE 2 | TABLE 3 |
|-----|---------|---------|---------|
| 411 | X       |         |         |
| 413 |         |         |         |
| 415 |         | X       |         |
| 417 | X       |         | X       |
| ⋮   |         |         |         |

HIERARCHICAL DATA STRUCTURE 1 450

411 — 451
— 453
— 455

HIERARCHICAL DATA STRUCTURE 2 460

413 — 461
— 463
— 465

HIERARCHICAL DATA STRUCTURE 3 470

415 — 471
— 473
— 475

HIERARCHICAL DATA STRUCTURE 4 480

DATA LOAD REQUEST 410

411 T2 T3
413 T1 T2
415 T1 T2
417 T1 T3

LOADED CHILD RECORD TABLE 420

| KEY | TABLE 1 | TABLE 2 | TABLE 3 |
|-----|---------|---------|---------|
| 411 | X | R | R |
| 413 | R | R | |
| 415 | R | X | |
| 417 | X | | X |
| ⋮ | | | |

DATABASE REQUEST 430

431 Query T2 record for 411
433 Query T3 record for 411
435 Query T1 record for 413
437 Query T2 record for 413
439 Query T1 record for 415

HIERARCHICAL DATA STRUCTURE 1 450

HIERARCHICAL DATA STRUCTURE 2 460

HIERARCHICAL DATA STRUCTURE 3 470

HIERARCHICAL DATA STRUCTURE 4 480

DATABASE RESPONSE 440

441 T2 record for 411
443 T3 record for 411
445 T1 record for 413
447 T2 record for 413
449 T1 record for 415

LOADED CHILD RECORD TABLE 420

| KEY | TABLE 1 | TABLE 2 | TABLE 3 |
|-----|---------|---------|---------|
| 411 | X | X | X |
| 413 | X | X |   |
| 415 | X | X |   |
| 417 | X |   | X |
| ⋮ |   |   |   |

BULK LAZY LOADING OF STRUCTURED DATA

BACKGROUND

Many computer applications load data from databases before performing operations to process the data. In some scenarios, for example where an application accesses a relatively small amount of data, all of the required data may be loaded into memory by the application from the database when the application is started. However, in other scenarios, for example where an application accesses a relatively large amount of data, the application may retrieve portions of the data from the database on-demand as the data is required by the application's operations. Such on-demand retrieval can be referred to as "lazy loading" since the data is loaded from the database as it is needed (or "lazily").

Some applications organize data in memory according to one or more logical domains of the applications. For example, an application may define data structures (such as object graphs) that arrange data into objects according to logical relations. However, the organization of the data in such object graphs may diverge (in some cases significantly) from the organization of the data in the database. Some previous techniques for loading data into such an object graph require each object to separately retrieve the data it needs from the database.

Therefore, there is room for improvement in technologies related to the loading of structured data.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In an example embodiment, a method is performed by one or more computing devices, wherein the method comprises receiving a request identifying a root data object of a hierarchical data structure; identifying a plurality of child data objects of the root data object in the hierarchical data structure, wherein the plurality of child data objects are associated with records stored in separate tables of a database; using a loaded child record table to identify a subset of the records associated with the plurality of child data objects that are not stored on one of the one or more computing devices; and transmitting a request to the database to retrieve the subset of the records that are not cached on the one of the one or more computing devices.

In another example embodiment, a system comprises a database and a server, wherein the server comprises a loaded child record table, one or more processors, and a memory storing instructions that, when executed by the one or more processors, cause the server to perform operations, the operations comprising: receiving a request identifying a plurality of parent data records, wherein the plurality of parent data records are roots of structured data objects comprising a plurality of child data records; determining, using the loaded child record table, which of the plurality of child data records is stored on the server for the plurality of parent data records; transmitting a request to the database, comprising a plurality of queries for a subset of the plurality of child data records that are not stored on the server; receiving the subset of the plurality of child data records that are not stored on the server from the database; and populating the structured data objects using the plurality of parent data records and the subset of the plurality of child data records received from the database.

Another example embodiment comprises one or more computer-readable storage media storing instructions that, when executed by one or more processors, cause the one or more processors to perform operations, the operations comprising: analyzing a hierarchical data structure to identify a plurality of child data objects of a root data object of the hierarchical data structure; determining, using a loaded child record table, that a plurality of database records associated with the plurality of child data objects have not been received from a database; generating a database request comprising a plurality of database queries for the plurality of database records associated with the plurality of child data objects; transmitting the generated request to a database; receiving the plurality of database records from the database; initializing the plurality of child data objects of the hierarchical data structure using the received plurality of database records; and adding entries, associating the received plurality of database records with the plurality of child data objects, to the loaded child record table.

As described herein, a variety of other features and advantages can be incorporated into the technologies as desired.

DETAILED DESCRIPTION

Example 1

Overview

The description provided herein is directed to various technologies for the loading of data from databases into data structures.

Some techniques for loading data into structured data objects (such as hierarchical data structures) require each object to retrieve the data it requires from the database separately. In at least some cases, this can lead to inefficient database accesses. For example, if several objects need to be initialized, and each requires a record from the database, each object would have to establish a connection with the database and send a separate data access request to the database. In applications where there is a limited number of database connections available, the problem may be exacerbated, as several of the objects may have to wait for an available connection before sending their request(s) to the database. In another example, a hierarchical data structure may have a root object that has several child objects (such as a collection of child objects of a same data type or multiple child objects of different data types). Loading the hierarchical data structure may require each child object to independently retrieve its data from the database. In addition to potentially requiring the transmission of several separate requests for the multiple child objects to the database, this technique can lead to data access inefficiencies. For example, in a scenario where the root object has a collection of child objects of a same data type. The child objects may make several requests to retrieve individual records from a same table in the database. In another example, in a scenario where the child objects have different data types, two of the child objects may require different fields from a same database record. This may result in two separate requests to retrieve data from the same database record in the database.

Various technologies described herein can be used to address these problems by bulk lazy loading data for structured data objects. For example, rather than having multiple objects load their data independently, the structures of the objects can be analyzed to identify data records that are required by child objects of the structured data objects. Additionally or alternatively, a process can identify one or more tables in a database storing the data records required to populate the child objects of the structured data objects. A single request can then be transmitted to the database comprising one or more queries to retrieve the required data records. The child objects of the structured data objects can then be loaded with the requested data records. Once the database records have been received, they can be stored locally (for example in a cache). A loaded child record table can be defined that identifies which database records have been stored and/are associated with which structured data objects. When one or more structured data objects need to subsequently be loaded, the loaded child record table can be inspected to determine which required database records have already been retrieved from the database and stored in the cache. A single request can be transmitted to the database that comprises one or more queries for only the required records which are not already in the cache. The structured data objects can then be initialized using the database records stored in the cache and any additional database records retrieved from the database.

In a different or further example, a request can be received to load data for a hierarchical data structure. The hierarchical data structure can be analyzed to identify one or more child data objects of the hierarchical data structure. Database records required by each of the child data objects can be identified, for example, by a process which identifies one or more tables required by the process to populate the hierarchical data structure. A single request can be generated and sent to the database to retrieve all the required database records. The child data objects of the hierarchical data structure can then be populated using the requested database records. The retrieved database records can be stored in a cache. A loaded child record table can be used to identify which database records are stored in the cache for the various hierarchical data structures. When a subsequent request to load data for a hierarchical data structure is received, the loaded child record table can be used to determine which required database records required by child data objects of the hierarchical data structure are already stored in the cache. A request can be sent to the database, requesting only the required database records that have not been cached. The hierarchical data structure can then be populated using the cached database records and any additional database records requested from the database.

Example 2

Example Systems and Methods for Bulk Lazy Loading of Structured Data

In any of the examples described herein, systems and methods can be provided for processing requests for the bulk lazy loading of structured data.

Figure 1:
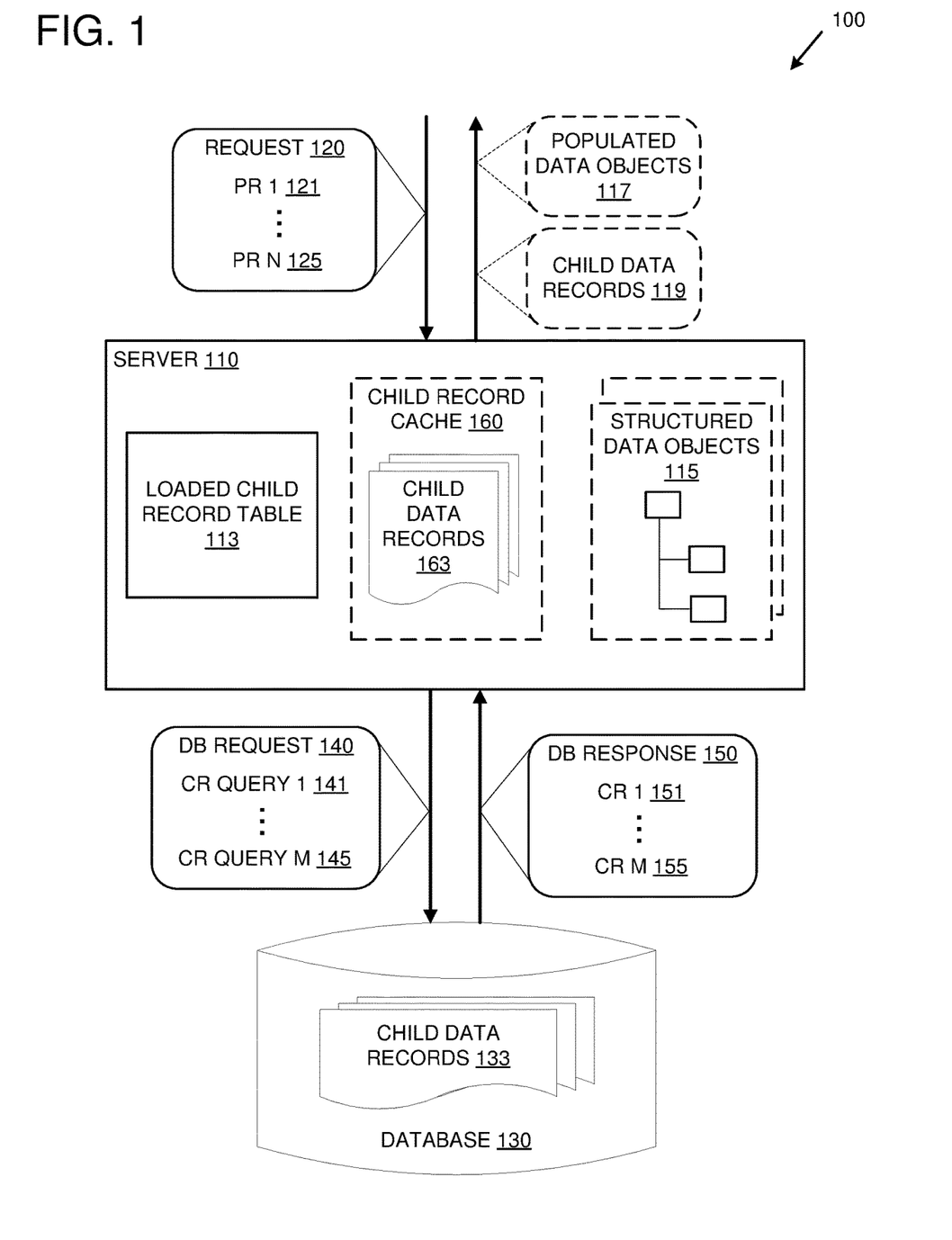
FIG. 1 is a system diagram depicting an example system for bulk lazy loading structured data.

FIG. 1 is a system diagram depicting an example system 100 for the bulk lazy loading of structured data. The example system 100 comprises a server 110 comprising a loaded child record table 113. The server 110 can be configured to use the loaded child record table 113 to process requests for data to initialize one or more structured data objects. For example, the server 110 can be configured to receive a request 120 identifying a plurality of parent data records 121-125. Each of the identified parent data records 121-125 can be a root of a structured data object comprising a plurality of child data records.

As used herein, the term "structured data object" refers to a data structure comprising a plurality of child data structures. Such child data structures can be defined separately as complex data types (e.g., data types comprising more than one value). For example, a first data structure can be defined as comprising a plurality of data values and a second data structure can be defined as comprising a different plurality of data values. Then, a third data structure can be defined with a first value that is an instance of the first data structure and a second value that is an instance of the second data structure. In such a configuration, the third data structure can be referred to as a structured data object and the instances of the first and second data structures can be referred to as child data objects (or child data records). In at least some embodiments, a structured data object can be a hierarchical data structure comprising a root (or parent) record and a plurality of child records that have a parent-child relationship to the root (or parent) record.

The example system 100 comprises a database 130 storing a plurality of child data records 133. In at least some embodiments, the database 130 comprises a plurality of tables in which the plurality of child data records 133 are stored. The server 110 can be configured to cache at least some of the child data records 163 in a child record cache 160 on the server 110. The child record cache 160 can be stored in whole, or in part, in one or more memories and/or one or more computer readable storage media of the server 110. Additionally or alternatively, all or part of the child record cache 160 can be stored on one or more other computing devices.

The loaded child record table 113 can identify which of the child data records 133 is/are available on the server 110. For example, the loaded child record table 113 can identify which of the child data records 133 is/are cached in the child record cache 160 on the server 110. Additionally or alternatively, the loaded child record table 113 can identify which of the child data records 133 is/are already loaded into the structured data objects 115. Entries in the loaded child record table 113 can be organized according to the relationships between the plurality of parent data records and the plurality of child data records. For example, an entry can be added to the loaded child record table 113 for a given parent data record. The entry can comprise one or more fields associated with the one or more child data records that are defined for the structured data object for which the given parent data object is a root.

Each of the one or more fields can contain a value which indicates whether or not a child data record associated with the given field is stored in the server 110. For example, the value can indicate that a child data record associated with the given field is stored in the child record cache 160. Alternatively, the value can indicate that a child data record associated with the given field has already been used to populate one or more structured data objects (e.g., 115). In at least some embodiments, each field can have a value set equal to one or more indicator values: a first value indicating that a child data record associated with the given field is not available on the server 110, a second value indicating that the child data record is not yet available on the server 110 but has been requested from the database, a third value indicating that the child data record has been loaded onto the server 110 but has not yet been used to populate a structured data object, and/or a fourth value indicating that the child data record has been used to populate a structured data object.

Subsequent to receiving the request 120, the server 110 can use the loaded child record table 113 to determine which of the child data records associated with the plurality of parent data records 121-125 is/are cached on the server 110. For example, for a given parent data record (e.g. 121) the server 110 can locate an entry for the given parent data record in the loaded child record table 113. The server 110 can then use the fields of the located entry to determine which of the child data records associated with the given parent data record have already been cached on the server 110. The server 110 can repeat this process for each of the plurality of parent data records 121-125.

The server 110 can then transmit a request 140 to the database 130, comprising a plurality of queries 141-145 for a subset of the plurality of child data records that are not cached on the server 110. The server 110 can generate the queries 141-145 based on the contents of the loaded child record table 113. For example, for a given parent data record, as a child data record is identified which the loaded child record table 113 indicates is not yet cached on the server 110, the server 110 can generate a query for the identified child data record. In at least some embodiments, where multiple uncached child data records are identified that are stored in a same table in the database 130, the server 110 can generate a single query to retrieve the multiple uncached child data records from the table. The server 110 can then transmit the plurality of the generated queries 141-145 to the database 130 in the single database request 140. In a particular example, the server 110 can use the loaded child record table 113 to determine that a first child data record of a given parent data record is stored in the server 110, but that a second child data record of the given parent data record is not stored in the server 110. The server 110 can include a query for the second child data record in the database request 140 and can omit a query for the first child data record from the request 140.

Subsequent to transmitting the request 140, the server 110 can receive a response 150 from the database 130 comprising the requested child data records 151-155. In at least some embodiments, the server 110 can be configured to transmit a response 119 comprising the subset of the plurality of child data records received from the database and the remaining subset of the plurality of child data records that were stored on the server 110. Additionally or alternatively, the server 110 can be configured to populate structured data objects 115 using the plurality of parent data records 121-125 and the subset of the plurality of child data records 151-155 received from the database 130. Populating the structured data objects 115 can further comprise using a plurality of child data records stored on the server 110. For example, for each of the parent data records 121-125, the server 110 can create a new structured data object using the parent data record as the root of the structured data object. Creating a new structured data object can comprise, for example, creating a new instance of a data type (such as a structure, class, etc.). In at least some embodiments, this can comprise instantiating a structured data object of a data type associated with the given parent data record. Additionally or alternatively, one or more members of the newly created structured data object can be populated using fields of the parent data record. The child data records retrieved from the database 130 and/or the child record cache 160 which are associated with the given parent data record can then be used to initialize child data structures of the structured data object. In such an embodiment, the populated structured data objects can be transmitted in a response 117.

Thus, in at least some embodiments, the loaded child record table 113 can be used to identify the set of child data records that are required to instantiate a plurality of structured data objects. The loaded child record table 113 can further identify which of this set of child data records have not yet been loaded on the server 110. A single request can be generated to retrieve the non-cached child data records from the database 130. The retrieved child data records can then be used to instantiate one or more child data structures of the plurality of structured data objects. In at least some embodiments, a previously initiated structured data object can be identified using the loaded child record table and the retrieved child data records can be used to add child data structures to the previously initiated structured data object. Additionally or alternatively, a combination of the retrieved and previously stored child data records can then be used to instantiate the plurality of structured data objects. Thus, in at least some scenarios, the overall amount of interaction with the database 130 required to instantiate the plurality of structured data objects can be reduced.

In at least some embodiments, the server 110 can be configured to use the loaded child record table 113 to determine that a request for one of the plurality of child data records was previously transmitted to the database 130 and to omit a query for the one of the plurality of child data records from the request 140. For example, when a query for a given child data record is transmitted to the database 130, the server 110 can be configured to update an entry in the loaded child record table 113 for the child data record to indicate that the child data record has been requested (but has not yet been received from) the database 130. If a subsequent request is received for a parent data record that is associated with the child data record, the updated entry in the loaded child record table 113 can be used to avoid sending a redundant request for the child data record to the database 130.

Subsequent to receiving the child data records 151-155 from the database 130, the server 110 can be configured to store the received child data records 151-155 on the server 110 (for example, by storing them in the child record cache 160 and/or loading them into one or more of the structured data objects 115). The server 110 can then add entries to the loaded child record table 113 for the received child data records 151-155. For example, for each of the received child data records 151-155, the server 110 can create or update an entry in the loaded child record table 113 to indicate that the child data record is now stored on the server 110.

In at least some embodiments, the child data records 133 can be managed in a non-relational structure, such as a hierarchical structure. For example, the child data records 133 can be managed in a hierarchical structure following the structure of the structured data objects 115. However, in some cases the hierarchical structure in which the child data records 133 are managed, and the structure of the structured data objects 115 may differ.

Figure 2:
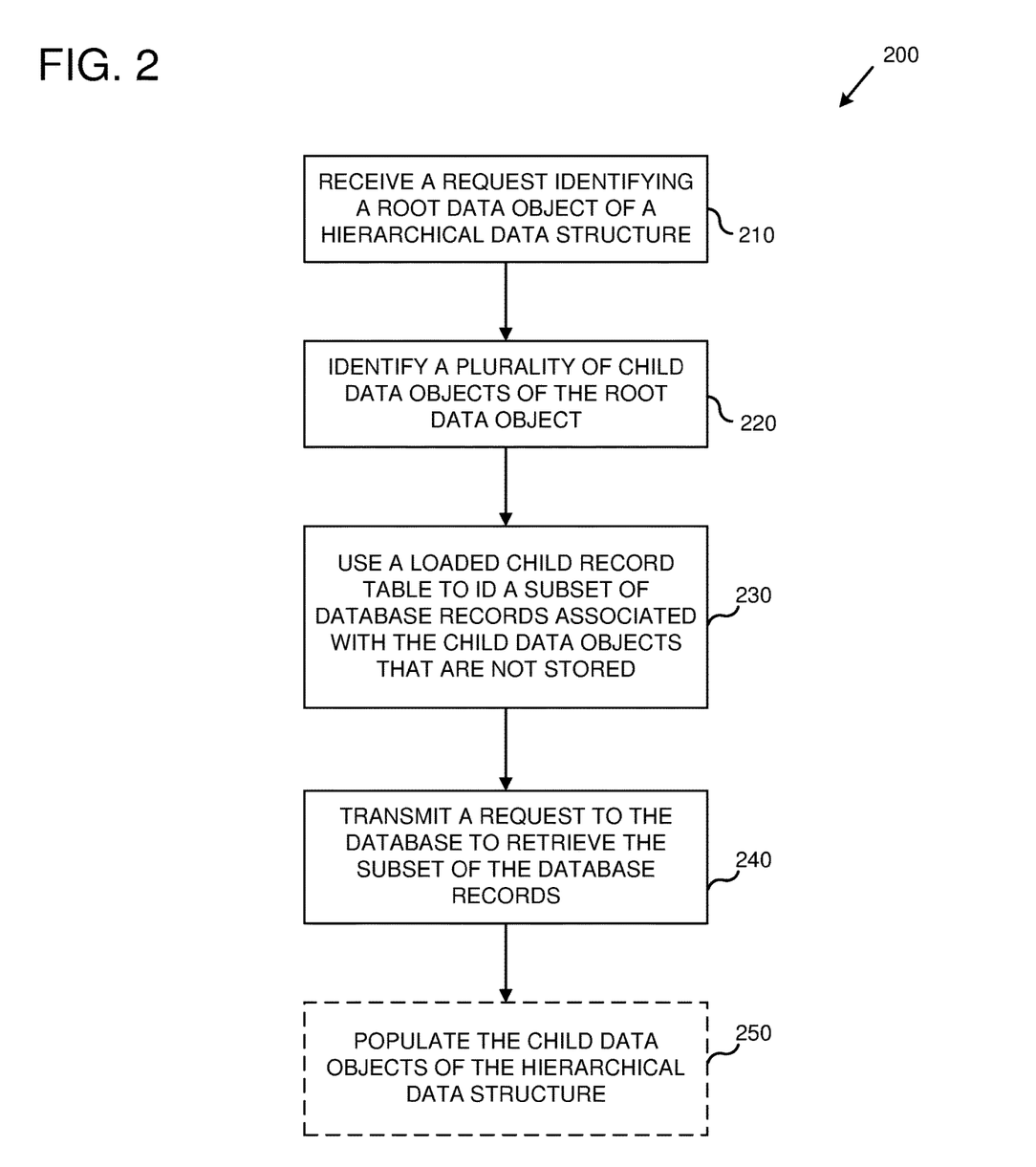
FIG. 2 is a flowchart of an example method for the bulk lazy loading of a hierarchical data structure.

FIG. 2 is a flowchart of an example method 200 for the bulk lazy loading of a hierarchical data structure. Any of the example systems described herein can be used to perform the example method 200. For example, the example system 100 can be used to perform the example method 200.

At 210, a request is received identifying a root data object of a hierarchical data structure. The hierarchical data structure comprises the root data object and a plurality of child data objects that are in a parent-child relationship with the root data object. Example hierarchical data structures include tree data structures, graph data structures, collection data structures (such as arrays, vectors, lists, or the like), object graphs, etc. A particular example of a hierarchical data structure is an instance of an object graph in which the root data object is an instance of a data type comprising multiple members (the child data objects) that are instances of other data types.

At 220, a plurality of child data objects of the root data object in the hierarchical data structure are identified. The identified plurality of child objects can be associated with records stored in a database. In at least some embodiments, at least some of the records can be stored in separate tables of the database. For example, in an embodiment where the child data objects are associated with different data types, the different data types can be associated with separate tables in the database. In such an embodiment, for a given child data object, a corresponding record can be stored in the database in a table associated with the child data object's data type. In another example, the data types can be associated with records in a database that are organized in hierarchical data structures. In a different or further embodiment, the root data object can be associated with a record stored in a database. For example, a data type of the root data object can be associated with a table in the database in which a record corresponding to the root data object is stored. In such an embodiment, the request received at 210 can comprise a unique identifier associated with the database record for the root data object.

In at least some embodiments, a data type associated with the root data object can be used to identify the child data objects of the hierarchical data structure. Example data types include data structure definitions, object class definitions, etc. Additionally or alternatively, the request received at 210 can comprise one or more child data object identifiers that are associated with the identifier for the root data object. Additionally or alternatively, the request can comprise an identifier for an operation or process to be performed using the hierarchical data structure. The operation or process can be used to identify the plurality of child data objects. For example, the operation or process may require less than all of the child data objects of the root data object. This subset of the root object's child data objects can be identified and used for the subsequent steps of the example method 200.

At 230, a loaded child record table is used to identify a subset of the database records associated with the child data objects that are not cached. The loaded child record table is a data structure that can be used to identify database records which have been stored in one or more memories and/or computer readable storage media of a given computing device. In at least some embodiments the loaded child record table can be stored in the same computing device in which the database records are cached. The loaded child record table can comprise a plurality of entries which correspond to hierarchical data structures. For example, entries can be added to the loaded child record table for one or more root data objects of one or more hierarchical data structures. An entry for a given root data object can comprise one or more fields corresponding to one or more child data objects of the root data object. A field for a given child data object can comprise a value, indicating whether or not a database record for the child data object is cached on the computing device.

The loaded child record table can be used to identify one or more of the database records associated with the plurality of child objects for the root data object identified by the request that are not cached on the computing device. For example, the request can comprise an identifier for the root data object. This identifier can be used to locate an entry in the loaded child record table associated with the root data object. The entry can comprise fields corresponding to the plurality of child data objects of the root data object. The values of the fields can be used to identify a subset of the plurality of child data objects whose associated database records are not cached on the computing device. In an embodiment where the root data object is associated with a database record, the loaded child record table can also be used to determine whether the database record associated with the root data object is cached on the computing device.

Data records can be cached on the computing device in a record cache. Additionally or alternatively, the data records can be used to populate one or more hierarchical data structures that are stored on the computing device. In such an embodiment, the loaded child record table can identify data records that have already been retrieved and used to populate the one or more hierarchical data structures.

At 240, a request is transmitted to the database to retrieve the subset of records that are not stored locally. The request can comprise one or more queries to retrieve the subset of unstored records from one or more tables in the database. In at least some embodiments, when the loaded child record table indicates that a database record for a given child data object is not stored on the computing device, a data type associated with the given child data object can be used to identify a table in the database that is associated with the data type. An identifier for the database record associated with the given child data object can be used to generate a query to retrieve the database record from the identified database table. For example, an identifier associated with the root data object can be used as a key to retrieve the database record for the child data object. Additionally or alternatively, the root data object can comprise an identifier for the child data object that can be used as a key in the query to retrieve the database record for the child data object. Other identifier schemes are also possible.

In an embodiment where the identified subset of records comprises records for child data objects with the data types that are associated with separate database tables, the request can comprise a plurality of queries to retrieve the subset of records from the separate tables of the database. Additionally or alternatively, if it is determined that multiple uncached records are stored in a same table in a database, a single query can be generated to retrieve the multiple records from the database table.

In a scenario where the root data object is associated with the database record, and the loaded child record table indicates that the database record is not cached on the computing device, the request can include a query for the record associated with the root data object.

In at least some embodiments, the request received at 210 can identify a plurality of root data objects of a plurality of hierarchical data structures. In such an embodiment, a plurality of child data objects can be identified for each of the plurality of root data objects. The loaded child record table can be used to identify a subset of uncached records associated with the plurality of child data objects for the plurality of root data objects, and the request transmitted at 240 can be a request to retrieve the uncached records associated with the plurality of child data objects for the plurality of root data objects.

In a different or further embodiment, the database is stored in a separate database server. In such an embodiment, transmitting the request can comprise transmitting the request to the database server via a computer network.

Optionally, at 250, the plurality of child data objects of the hierarchical data structure are populated using the subset of records retrieved from the database. The records which were cached can also be used to populate child data objects of the hierarchical data structure.

In at least some scenarios, the subset of records retrieved from the database can be stored in a cache. Entries can be added to the loaded child record table to indicate that the records have been stored in a cache. Subsequent requests to populate instances of the hierarchical data structure can be processed using the cached records instead of re-retrieving the records from the database. For example, if the loaded child record table indicates that a record was previously stored on the computing device, then it can be retrieved from its storage location and used to populate one or more of the child data objects. Additionally or alternatively, the child record table can indicate that the record was previously retrieved and used to populate one or more of the child data objects. In such a scenario, the previously populated one or more child data objects can be used without re-populating them.

In at least some embodiments, the loaded child record table can be used to determine that a record associated with one of the plurality of child data objects is not cached, but that another request for the record has been transmitted to the database. For example, an entry for the child data object in the loaded child record table can comprise a value which indicates that the query for the database record associated with the child data object has been transmitted to the database, but the record has not yet been received from the database. In such scenarios, a query for the database record can be omitted from the request that is transmitted to the database to retrieve the subset of records that are not cached on the computing device.

Example 3

Example Cached Child Record Table

In any of the examples described herein, systems and methods can be provided for using a loaded child record table to process requests for bulk loading of hierarchical data structures.

Figure 3:
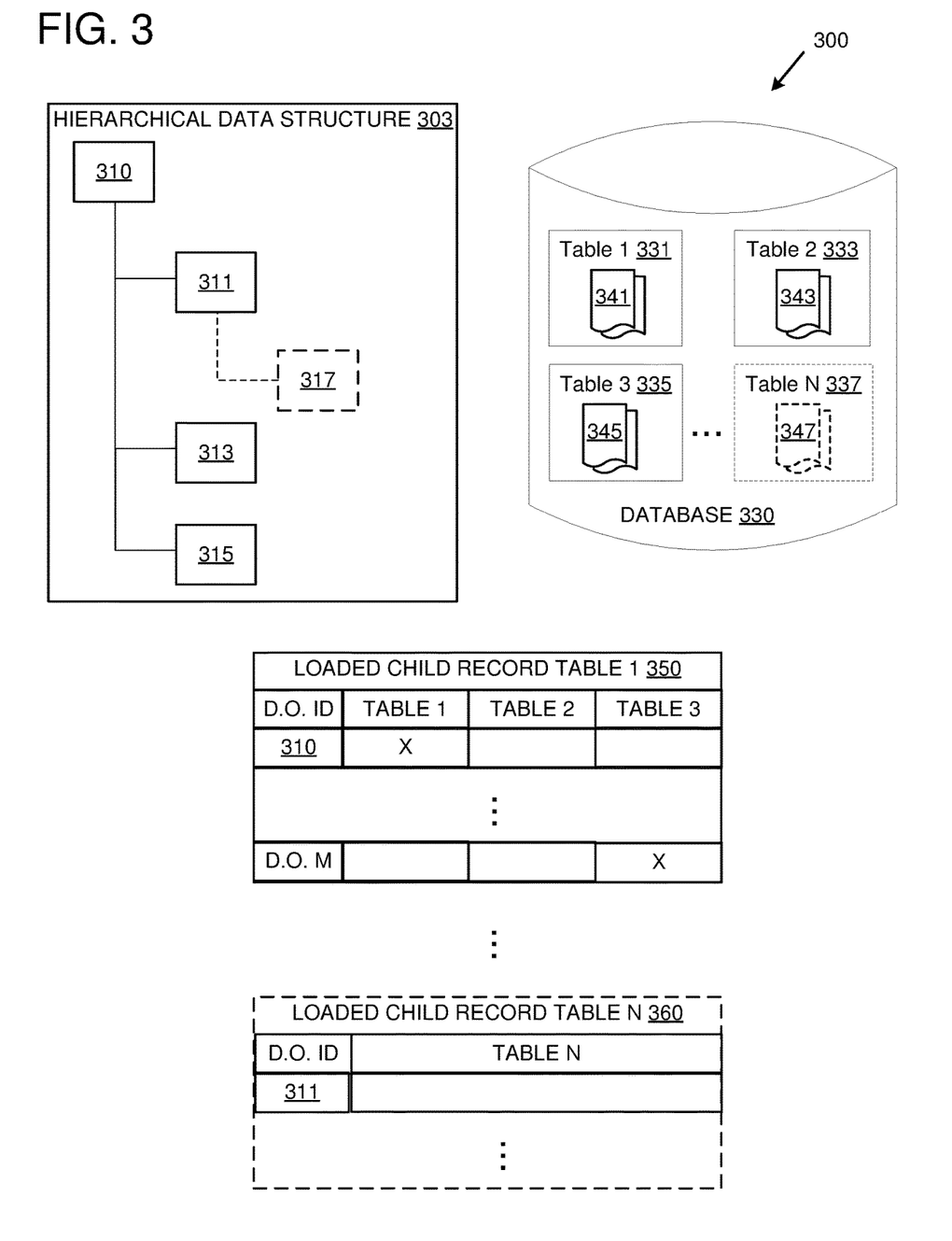
FIG. 3 is a system diagram depicting an example system comprising a loaded child record table for use in bulk loading hierarchical data structures.

FIG. 3 is a system diagram depicting an example system 300 comprising a loaded child record table 350 for use in bulk loading of hierarchical data structures (e.g., 303). The example system 300 further comprises a database 330. The hierarchical data structure and 303, the loaded child record table 350, and the database 330 can be stored by one or more computing devices (not shown) such as one or more server computers.

The hierarchical data structure 303 can be analyzed to identify a plurality of child data objects 311-315 of a root data object 310 of the hierarchical data structure 303. The loaded child record table 350 can be used to determine that a plurality of database records associated with the plurality of child data objects 311-315 are not cached. A database request comprising a plurality of database queries for the plurality of database records associated with the plurality of child data objects 311-315 can be generated. The generated request can be transmitted to the database 330. Responsive to the transmitted request, the plurality of database records can be received from the database 330. In at least some embodiments, the received plurality of database records can be stored in a cache. Entries, associating the received plurality of database records with the plurality of child data objects 311-315, can be added to the loaded child record table 350.

In at least some embodiments, it can be determined that the plurality of database records are stored in separate tables (e.g. 331-335) in the database 330. In such an embodiment, generating the database request can comprise generating separate queries to retrieve the plurality of database records from the separate database tables.

Optionally, the plurality of child data objects 311-315 can be initialized using the received plurality of database records. For example, each of the plurality of child data objects 311-315 can represent a member of the root data object 310 that is associated with a particular data type. For a given child data object, an instance of the associated data type can be created and populated with values contained in the database record associated with the child data object.

In a particular example, the hierarchical data structure 303 can be analyzed to identify the root data object 310 and its child data objects 311-315. Data types associated with the child data objects 311-315 can be used to identify associated tables in the database 330 in which records for the respective child data objects are stored. For example, a data type of the child data object 311 can be used to determine that the table 331 in the database 330 stores a database record (e.g., 341) associated with the child data object 311. A data type of the child data object 313 can be used to determine that the table 333 stores a database record (e.g., 343) associated with the child data object 313. A data type of the child data object 315 can be used to determine that the table 335 stores a database record (e.g., 345) associated with the child data object 315. It is possible to use an alternative or additional data source (such as metadata associated with a child data object or a data type of the child data object, etc.) to identify a database table that corresponds to a given child data object.

The loaded child record table 350 can comprise one or more rows associated with the various hierarchical data structures and/or root data objects of various hierarchical data structures. For example, in FIG. 3 the loaded child record table 350 is depicted as comprising a plurality of rows wherein each row is associated with a different root data object. A row in the loaded child record table 350 can be identified that is associated with the root data object 310. The row for the root data object 310 comprises a plurality of fields associated with database tables 331, 333, and 335, respectively. The field for table 331 contains a value that indicates that the database record for the child data object 311 (which is associated with the table 331) is already stored in a cache. The fields for tables 333 and 335 contain values that indicate that the database records for the child data objects 313 and 315 (which are associated with the tables 333 and 335, respectively) are not stored in the cache.

Additionally or alternatively, the fields in the loaded child record table 350 can indicate whether or not associated child data objects have already been populated with records from the database 330. For example, the value of the field for table 331 can indicate that the database record for the child data object 311 was previously retrieved and used to populate the child data object 311. The values of the fields for the tables 333 and 335 can indicate that the child data objects 313 and 315, respectively, have not yet been populated with records from the database 330.

Based on this analysis of the loaded child record table 350, a database request can be generated which comprises a query to retrieve a database record (e.g., 343) for child data object 313 from the database table 333 and a query to retrieve a database record (e.g., 345) for the child data object 315 from the database table 335. However, a query to retrieve a database record for the child data object 311 is not included in the request because that database record is already stored in the cache. The generated request can be transmitted to the database 330, responsive to which the queried database records can be received from the database 330.

The received database records for the child data objects 313 and 315, and the cached database record for the child data object 311, can be used to instantiate the child data objects 311-315 of the hierarchical data structure 303. In at least some embodiments, the received database records (e.g., 343 and 345) can be stored in the cache. The row for the root data object 310 in the loaded child record table 350 can be updated to indicate that the database records for the child data object 313 and 315 (which are associated with the database tables 333 and 335, respectively) are now stored in the cache.

Thus, database accesses can be reduced in at least some cases. Rather than initializing the child data objects 311-315 in isolation, which would require separate database requests to retrieve associated database records for the respective child data objects, a single request is generated that includes queries for all data records necessary to initialize the hierarchical data structure 303. Furthermore, this single database request includes queries only for database records that are not already cached. Thus, in at least some cases, using at least some of the techniques described here, the overall volume of database accesses can be reduced.

In at least some embodiments, the hierarchical data structure 303 can include multiple levels of child data objects. For example, the root data object 310 can comprise a grandchild data object 317, which is a child data object of the child data object 311. In such an embodiment, the process of data loading described above with respect to the root data object 310 can be repeated, but in this case treating the child data object 311 as if it were a root data object. For example, another loaded child record table 360 can be used to track whether database records for child data objects (e.g., 317) of the data object 311 are stored in the cache. The grandchild data object 317 can be associated with a record (e.g., 347) stored in a table 337 of the database 330. The loaded child record table 360 can be used to determine that the database record stored in the table 337 is not cached. The request transmitted to the database 330 can include a query to retrieve the database record (e.g., 347) from the database table 337. The retrieved record can then be used to initialize the grandchild object 317 as part of the initialization of the hierarchical data structure 303. Although only a single grandchild data object is depicted in FIG. 3, other numbers of grandchild data objects are possible (as are additional levels of ancestry, such as great-grandchild data objects, etc.). In at least one embodiment, the loaded child record tables 350-360 can be organized in a hierarchical structure which follows an object structure of the hierarchical data structure 303. For example, the loaded child record table 360 can be stored as a value of a field of row 310 in the loaded child record table 350.

Example 4

Example Bulk Lazy Loading of Hierarchical Data Structures

In any of the examples described herein, a loaded child record table can be provided for determining the storage status of database records associated with child data objects.

Figure 4A:
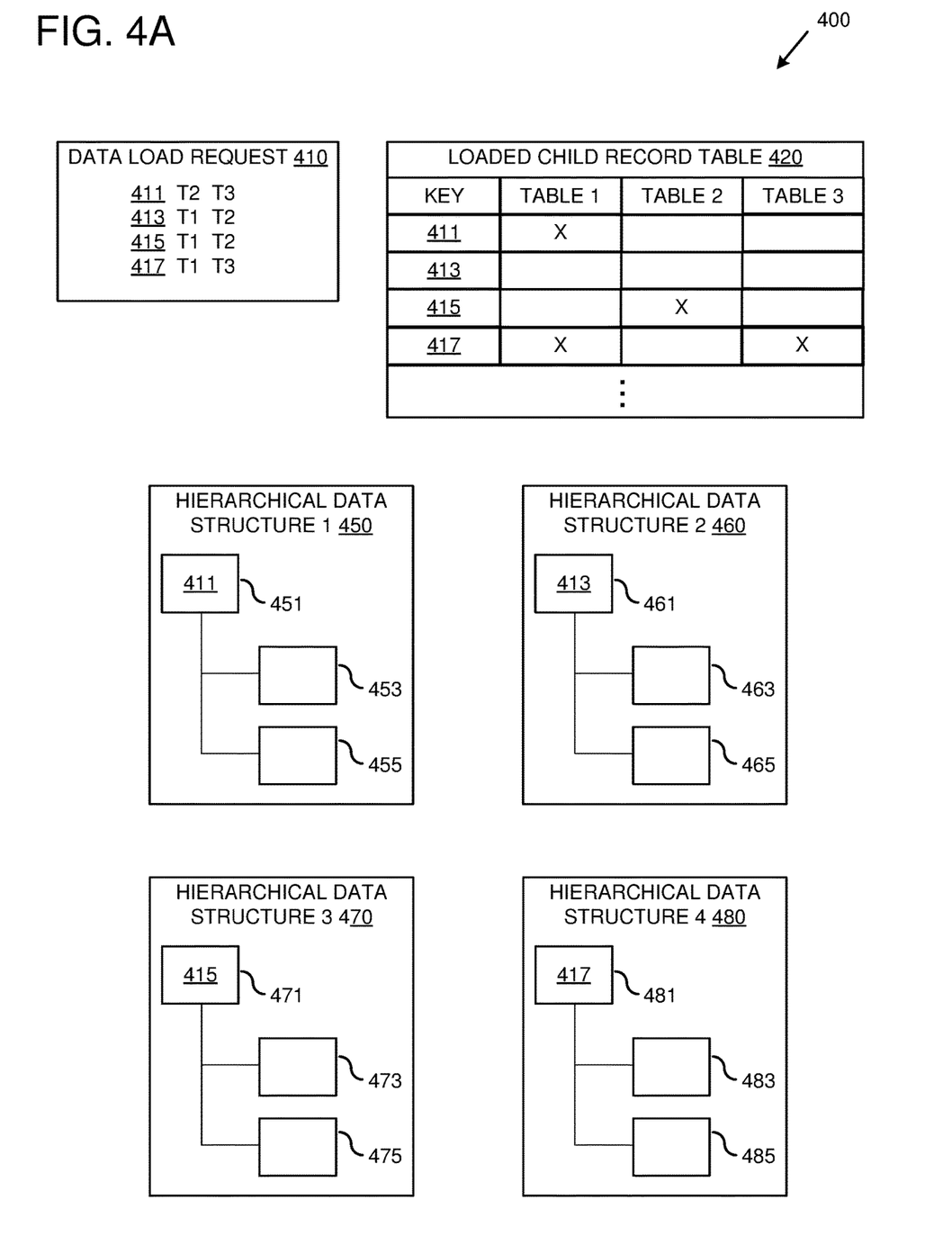
FIGS. 4A-C are system diagrams depicting an example system for processing a data load request using a loaded child record table to initialize hierarchical data structures.
Figure 4B:
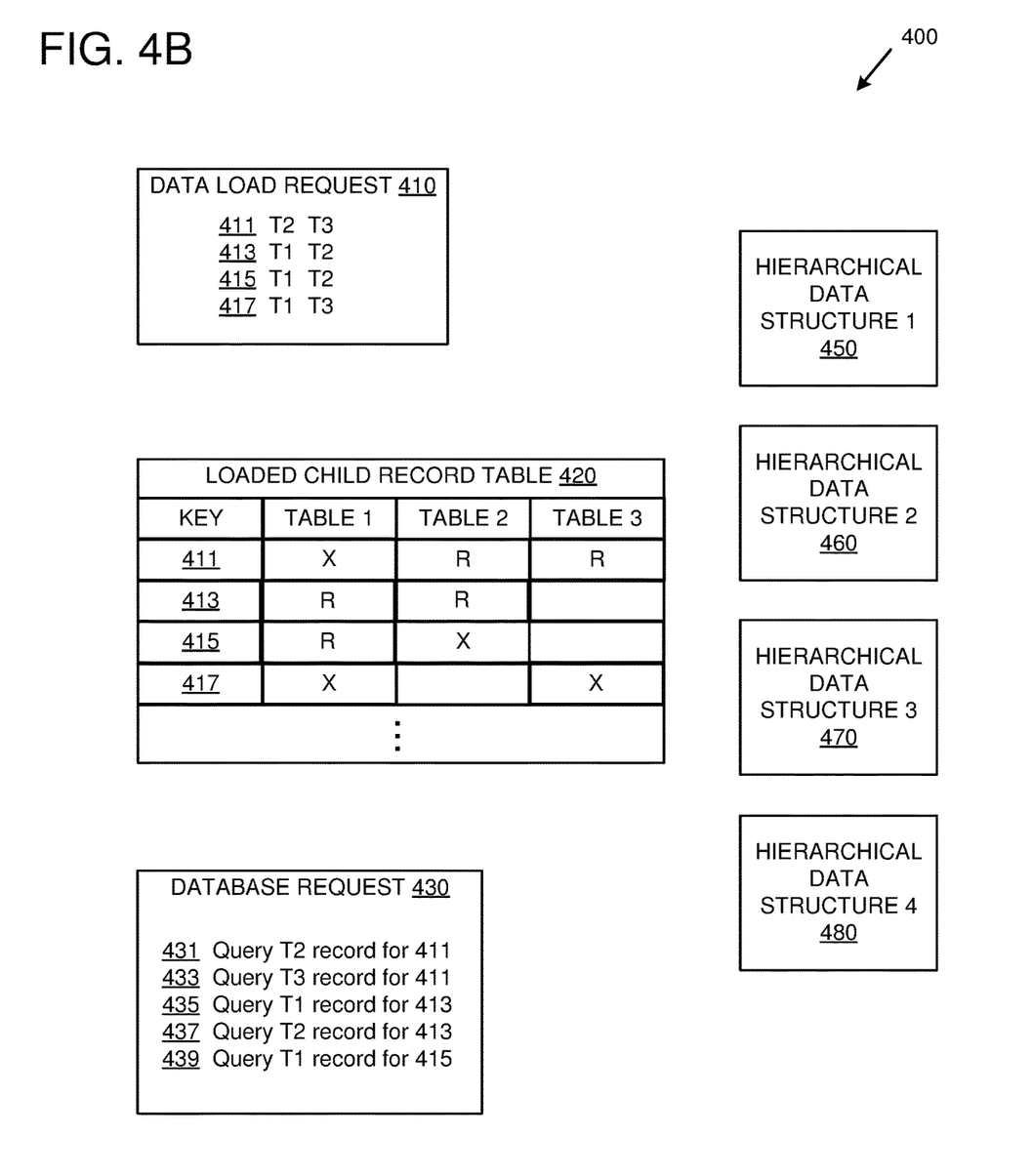
Figure 4C:
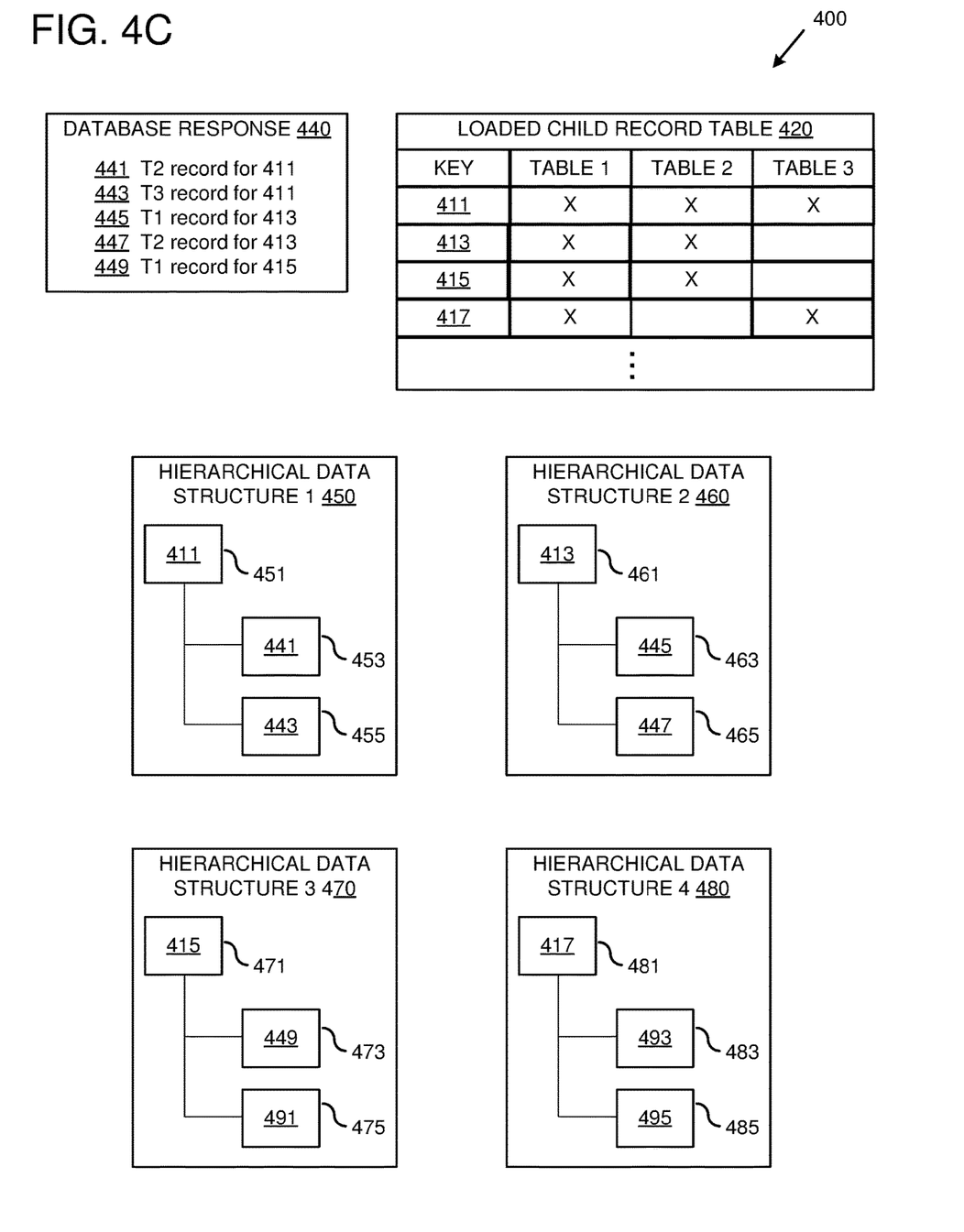

FIGS. 4A-C are system diagrams depicting an example system 400 for processing a data load request 410 using a loaded child record table 420 to initialize one or more hierarchical data structures (e.g., 450-480). The loaded child record table 420 and the one or more hierarchical data structures (e.g., 450-480) can be stored on one or more computing devices, such as one or more server computers.

FIG. 4A depicts the loaded child record table 420 and uninitialized hierarchical data structures 450-480. The hierarchical data structure 450 comprises a root data object 451 which comprises a key 411 for the root data object 451. The hierarchical data structure 460 comprises a root data object 461 which comprises a key 413 for the root data object 461. The hierarchical data structure 470 comprises a root data object 471 which comprises a key 417 for the root data object 471. The hierarchical data structure 480 comprises a root data object 481 which comprises a key 417 for the root data object 481. Each of the hierarchical data structures 450-480 is depicted in FIG. 4A as having two child data objects (453 and 455, 463 and 465, 473 and 475, 483 and 485), however different numbers of child data objects are possible.

The example system 400 comprises a data load request 410. The data load request 410 identifies the root data object keys 411-417 and a plurality of database records which should be loaded into child data objects of the respective root data objects. For example, the data load request 410 indicates that a child data object of the root data object 451 should be initialized with a record from Table 2 ("T2") of a database and that another child data object of the root data object 451 should be initialized with a record from Table 3 ("T3") of the database. The data load request 410 further indicates that a child data object of the root data object 461 should be initialized with a record from Table 1 ("T1") of the database and that another child data object of the root data object 461 should be initialized with a record from Table 2. The data load request 410 further indicates that a child data object of the root data object 471 should be initialized with a record from Table 1 and that another child data object of the root data object 471 should be initialized with a record from Table 2. The data load request 410 further indicates that a child data object of the root data object 481 should be initialized with a record from Table 1 and that another child the data object of the root data object 481 should be initialized with a record from Table 3.

The loaded child record table 420 can be used to determine which database records for child data objects of the various root data objects 451-481 have already been retrieved from the database. For example, as depicted in FIG. 4A, the loaded child record table 420 indicates that a database record for a child data object of the root data object with key 411 (451) that is stored in Table 1 of the database has already been retrieved from the database, but database records for child data objects of the root data object 451 that are stored in Tables 2 and 3 have not been retrieved from the database. The loaded child record table 420 further indicates that no database records for child data objects of the root data object with key 413 (461) have been retrieved from the database. The loaded child record table 420 further indicates that a database record for a child data object of the root data object with key 415 (471) stored in Table 2 has been retrieved from the database, but the database records for child data objects of the root data object 471 that are stored in Tables 1 and 3 have not been retrieved from the database. The loaded child record table 420 further indicates that database records for child data objects of the root data object with key 417 (481) that are stored in Tables 1 and 3 have been retrieved from the database, but that a database record for a child data object of the root data object 481 that is stored in Table 2 has not been retrieved from the database.

FIG. 4B depicts the example system 400 comprising the data load request 410, the loaded child record table 420, the hierarchical data structures 450-480, and a generated database request 430. The loaded child record table 420 is analyzed to determine which of the database records identified by the data load request 410 have not yet been retrieved from the database. Based on this analysis, the database request 430 is generated, comprising queries 431-439 for the data records that have not yet been retrieved.

For example, it can be determined using the loaded child record table 420 that records stored in Tables 2 and 3 of the database that are associated with child data objects of the root data object with key 411 (451) are not stored locally (for example, in a cache and/or as part of one or more of the hierarchical data structures 450-480). Queries 431 and 433 are thus included in the database request 430 to retrieve the records stored in Tables 2 and 3 that are associated with child data objects of the root data object with key 411 (451). It can be further determined using the loaded child record table 420 that records stored in Tables 1 and 2 that are associated with child data objects of the root data object with key 413 (461) are not stored locally. Queries 435 and 437 are thus included in the database request 430 to retrieve the records stored in Tables 1 and 2 that are associated with child data objects of the root data object with key 413 (461). It can be further determined using the loaded child record table 420 that a record stored in Table 1 of the database that is associated with a child data object of the root data object with key 415 (471) is not stored locally and that a record stored in Table 2 that is associated with a child data object of the root data object with key 415 (471) is stored locally (for example, a copy of the record may be stored in a cache and/or a child data object of one of the hierarchical data structures may have previously been initialized using the record). The query 439 is thus included in the database request 430 to retrieve the record stored in Table 1 that is associated with a child data object of the root data object with key 415 (471). However, a query is not included to retrieve the record from Table 2 for the root data object with key 415 because it was previously retrieved from the database. It can be further determined using the loaded child record table 420 that records stored in database Tables 1 and 3 that are associated with child data objects of the root data object with key 417 (481) are stored locally. Thus, queries to retrieve these records are not included in the database request 430.

Although a separate query is listed for each individual record in the database request 430, this is not intended to be limiting. For example, it is possible in at least some embodiments to a create single query to retrieve multiple records that are stored in a same table in the database. In such an embodiment, the database request 430 can comprise three queries: a first query to retrieve the records for 413 and 415 from Table 1, a second query to retrieve records for 411 and 413 from Table 2, and a third query to retrieve the record for 411 from Table 3.

Entries in the loaded child record table 420 for queried records can be updated to indicate that a request for the records has been transmitted to the database. For example, the entries in the loaded child record table 420 that are included in the queries 431-439 have been updated in FIG. 4B to indicate that the records have been requested ("R"). This can be useful, for example, in scenarios where various operations for retrieving the database records and/or initializing the hierarchical data structures or performed asynchronously. If, after the database request 430 is transmitted to the database, another data load request (not shown) identifying one or more of the same database records is received, the updated entries in the cache child record table 420 can be used to determine that the one or more database records has been requested from the database but is not yet stored locally. Based on such a determining, queries for the database records that have already been requested can be omitted from any subsequently generated database request.

In at least some embodiments, different values can be used in the entries of the loaded child record table 420 to indicate different statuses of the hierarchical data structures with respect to the database records. For example, a first value can be used to indicate that a record for a child data object has not been retrieved from the database (e.g., a null value), a second value can be used to indicate that the record has not been retrieved but a request for the record has been sent to the database but the record has not yet been received (e.g., a value of "R"), a third value can be used to indicate that the record has been retrieved from the database but has not yet been used to populate the corresponding child data object (e.g., a value of "L"), and/or a fourth value can be used to indicate that the record has been retrieved and has been used to populate the corresponding child data object (e.g., a value of "X").

FIG. 4C depicts the example system 400, comprising the child record table 420, a database response 440, and the hierarchical data structures 450-480. Subsequent to transmitting the database request 430, depicted in FIG. 4B, the database response 440 is received from the database. The database response 440 includes the requested database records 441-449 that were identified by the database queries 431-439. The received database records 441-449 can be used to initialize the hierarchical data structures 450-480. Initializing a hierarchical data structure can comprise populating one or more fields of one or more data objects of the hierarchical data structure with data in the one or more received database records 441-449.

For example, it can be determined that the child data object 453 of the root data object 451 is associated with Table 2. The record 441, which is a Table 2 record for a child data object of the root data object 451, can be used to initialize the child data object 453. It can be determined that the child data object 455 of the root data object 451 is associated with Table 3. The record 443, which is a Table 3 record for a child data object of the root data object 451, can be used to initialize the child data object 455. It can be determined that the child data object 463 of the root data object 461 is associated with Table 1. The record 445, which is a Table 1 record for a child data object of the root data object 461, can be used to initialize the child data object 463. It can be determined that the child data object 465 of the root data object 461 is associated with Table 2. The record 447, which is a Table 2 record for a child data object of the root data object 461, can be used to initialize the child data object 465. It can be determined that the child data object 473 of the root data object 471 is associated with Table 1. The record 449, which is a Table 1 record for a child data object of the root data object 471, can be used to initialize the child data object 473.

It can be determined that the child data object 475 of the root data object 471 is associated with Table 2. However, the database response 440 does not include a record from Table 2 for a child data object of the root data object 471. This is because the loaded child record table 420 indicated that a Table 2 record associated with the child data object of the root data object 471 was stored locally and, thus, a query for this database record was not included in the database request 430. In an embodiment where this database record (491) is stored locally in a cache the record 491 can be retrieved from the cache and used to initialize the child database object 475. Alternatively, the record 491 may have been previously retrieved from the database and previously used to initialize the child database object 475.

It can be determined that the child data objects 483 and 485 are associated with Tables 1 and 3, respectively. The database response 440 does not include database records for these child data objects of the root data object 481. This is because the loaded child record table 420 indicated that database records stored in Tables 1 and 3 that are associated with the root data object 481 were stored locally and, thus, queries for these database records were not included in the database request 430. In an embodiment where these database records (493 and 495) are stored in a cache, the database records 493 and 495 can be retrieved from the cache and used to initialize the child database objects 483 and 485, respectively. Alternatively, the records 493 and 495 may have been previously retrieved from the database and previously used to initialize the child data objects 483 and 485, respectively.

The entries for these records in the loaded child record table 420 can be updated to indicate that the data from the database records 441-449 are now stored locally in the hierarchical data structures 450-480. Optionally, the database records 441-449 can be stored in the cache. In an embodiment where the database request 430 is transmitted to the database asynchronously, after the database request 430 has been transmitted to the database, the response 440 can be received asynchronously from the database. Once the requested database records 441-449 have been received, their entries in the loaded child record table 420 can be asynchronously updated to indicate that the records are now stored locally (for example, in the cache). In at least some such embodiments, the loaded child record table 420 can be asynchronously inspected to determine when entries for the data records have been added or updated. When it is detected, based on the loaded child record table 420, that the data records have been stored locally, the plurality of child data objects for the root data objects 451-481 can be initialized using the stored plurality of records.

In at least some embodiments, the loaded child record table 420 can be used to track whether data records for root data objects (e.g., 451, 461, 471, and 481) have been retrieved from the database. For example, the loaded child record table 420 can include a column for another table (not shown) in the database that stores data records for one or more of the root data objects. In such an embodiment, the loaded child record table 420 can be used to selectively retrieve data records for the root data objects and initialize the root data objects as described above with respect to the child data objects.

The hierarchical data structures 450-480 are depicted in FIGS. 4A and 4B as comprising child data objects that are instantiated, but that do not yet contain data. However, this is not intended to be limiting. One or more of the child data objects can be instantiated on-demand. For example, a child data object can be instantiated when a corresponding record is received from the database. The instantiated child data object can then be initialized using data in the corresponding database record.

Example 5

Example Computing Systems

Figure 5:
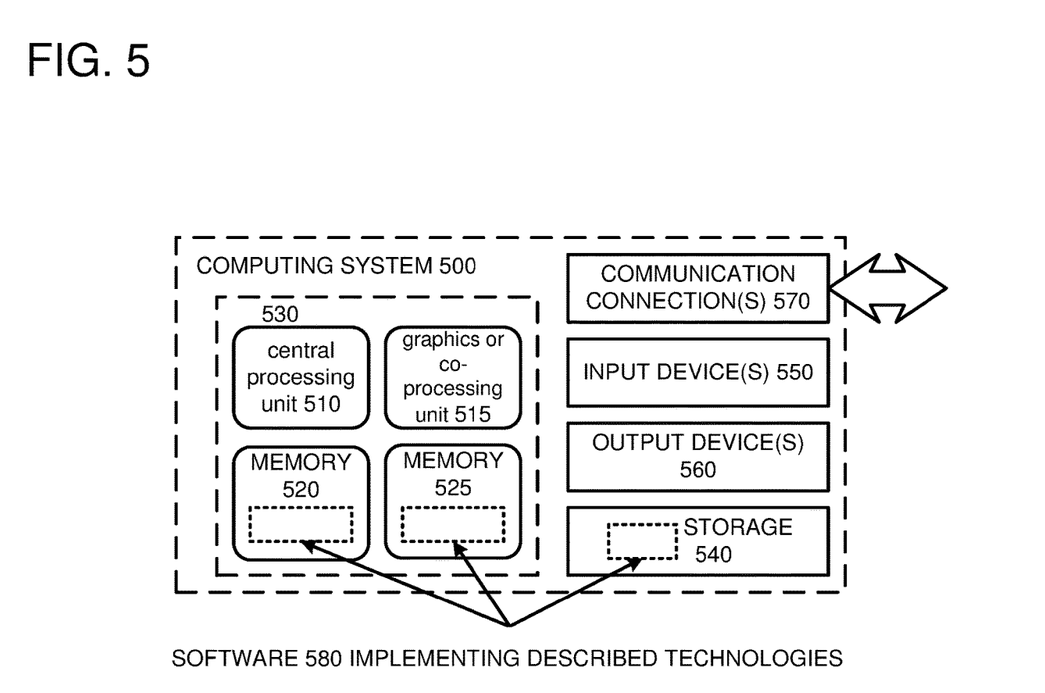
FIG. 5 is a block diagram of an example computing system in which some described embodiments can be implemented.

FIG. 5 depicts a generalized example of a suitable computing system 500 in which the described innovations may be implemented. For example, the computing system 500 can be used as a client computing device and/or server computer as described herein. The computing system 500 is not intended to suggest any limitation as to scope of use or functionality, as the innovations may be implemented in diverse general-purpose or special-purpose computing systems.

With reference to FIG. 5, the computing system 500 includes one or more processing units 510, 515 and memory 520, 525. In FIG. 5, this basic configuration 530 is included within a dashed line. The processing units 510, 515 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 5 shows a central processing unit 510 as well as a graphics processing unit or co-processing unit 515. The tangible memory 520, 525 may be volatile memory (e.g., registers, cache, RAM), non-volatile memory (e.g., ROM, EEPROM, flash memory, solid state drives, etc.), or some combination of the two, accessible by the processing unit(s). The memory 520, 525 can store software 580 implementing one or more innovations described herein, in the form of computer-executable instructions suitable for execution by the processing unit(s).

A computing system may have additional features. For example, the computing system 500 includes storage 540, one or more input devices 550, one or more output devices 560, and one or more communication connections 570. An interconnection mechanism (not shown) such as a bus, controller, or network interconnects the components of the computing system 500. Typically, operating system software (not shown) provides an operating environment for other software executing in the computing system 500, and coordinates activities of the components of the computing system 500.

The tangible storage 540 may be removable or non-removable, and includes magnetic disks, magnetic tapes or cassettes, solid state drives, CD-ROMs, DVDs, or any other medium which can be used to store information in a non-transitory way and which can be accessed within the computing system 500. The storage 540 can store instructions for the software 580 implementing one or more innovations described herein.

The input device(s) 550 may be a touch input device such as a keyboard, mouse, pen, or trackball, a voice input device, a scanning device, or another device that provides input to the computing system 500. For video encoding, the input device(s) 550 may be a camera, video card, TV tuner card, or similar device that accepts video input in analog or digital form, or a CD-ROM or CD-RW that reads video samples into the computing system 500. The output device(s) 560 may be a display, printer, speaker, CD-writer, or another device that provides output from the computing system 500.

The communication connection(s) 570 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 6

Example Cloud Computing Environment

Figure 6:
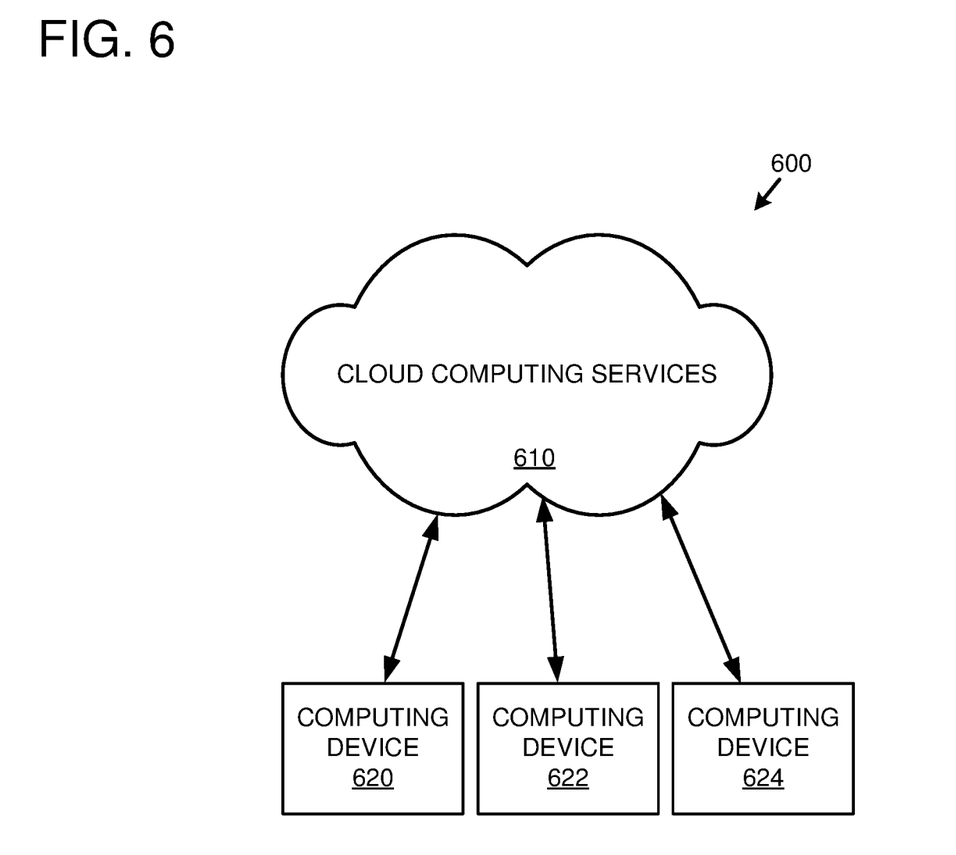
FIG. 6 is an example cloud computing environment that can be used in conjunction with the technologies described herein.

FIG. 6 depicts an example cloud computing environment 600 in which the described technologies can be implemented. The cloud computing environment 600 comprises cloud computing services 610. The cloud computing services 610 can comprise various types of cloud computing resources, such as computer servers, data storage repositories, networking resources, etc. The cloud computing services 610 can be centrally located (e.g., provided by a data center of a business or organization) or distributed (e.g., provided by various computing resources located at different locations, such as different data centers and/or located in different cities or countries).

The cloud computing services 610 are utilized by various types of computing devices (e.g., client computing devices), such as computing devices 620, 622, and 624. For example, the computing devices (e.g., 620, 622, and 624) can be computers (e.g., desktop or laptop computers), mobile devices (e.g., tablet computers or smart phones), or other types of computing devices. For example, the computing devices (e.g., 620, 622, and 624) can utilize the cloud computing services 610 to perform computing operators (e.g., data processing, data storage, and the like).

Example 7

Example Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (e.g., any available computing device, including smart phones or other mobile devices that include computing hardware). Computer-readable storage media can include any tangible media that can be accessed within a computing environment (e.g., one or more optical media discs such as DVD or CD, volatile memory components (such as DRAM or SRAM), or non-volatile memory components (such as flash memory, solid state drives, or magnetic media such as hard drives)). By way of example and with reference to FIG. 5, computer-readable storage media include memory 520 and 525, and storage 540. The term computer-readable storage media does not include signals and carrier waves. In addition, the term computer-readable storage media does not include communication connections (e.g., 570).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

The disclosed technology is not limited to any specific computer language or program. For instance, the disclosed technology can be implemented by software written in C++, Java, Perl, JavaScript, assembly language, or any other suitable programming language. Likewise, the disclosed technology is not limited to any particular computer or type of hardware.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technologies may be applied, it should be recognized that the illustrated embodiments are examples of the disclosed technologies and should not be taken as a limitation on the scope of the disclosed technologies. Rather, the scope of the disclosed technologies includes what is covered by the scope and spirit of the following claims.

What is claimed is:

1. A method performed by one or more computing devices, the method comprising:
receiving a request identifying a root data object of a hierarchical data structure;
identifying a plurality of child data objects of the root data object in the hierarchical data structure, wherein the plurality of child data objects are associated with records stored in separate tables of a database;
identifying a subset of the records associated with the plurality of child data objects that are not cached on one of the one or more computing devices, the identifying comprising searching within a loaded child record table having entries that identify root data objects of different hierarchical data structures and which database records for child data objects of the root data objects of the different hierarchical data structures from the separate tables of the database are cached on the one or more computing devices; and
transmitting a request to the database to retrieve the subset of the records that are not cached on the one of the one or more computing devices.

2. The method of claim 1, further comprising:
receiving the subset of the records from the database;
storing the subset of the records in a cache; and
adding entries to the loaded child record table, indicating that the subset of the records are stored in the cache.

3. The method of claim 1, further comprising:
receiving the subset of the records from the database; and
populating the child data objects of the hierarchical data structure using the subset of the records.

4. The method of claim 3, wherein the populating the child data objects of the hierarchical data structure further comprises:
populating at least one of the child data objects using a cached record that is identified by the loaded child record table.

5. The method of claim 1, further comprising:
using the loaded child record table to determine that a request for a record has been transmitted to the database; and
omitting a query for the record from the request transmitted to the database.

6. The method of claim 1, wherein the request comprises a plurality of queries to retrieve the subset of the records from the separate tables of the database.

7. The method of claim 1, wherein the method further comprises:
identifying a grandchild data object of one of the child data objects, wherein the grandchild data object is associated with a record stored in a table of the database;
using another loaded child record table to determine that the record associated with the grandchild data object is not stored on the one of the one or more computing devices; and
including a query for the record associated with the grandchild data object in the request transmitted to the database.

8. The method of claim 1, further comprising:
using the loaded child record table to determine that a record associated with the root data object is not stored on the one of the one or more computing devices; and
including a query for the record associated with the root data object in the request transmitted to the database.

9. The method of claim 1, wherein:
the request identifies a plurality of root data objects of a plurality of hierarchical data structures; and
the method further comprises:
identifying a plurality of child data objects for each of the plurality of root data objects;
using the loaded child record table to identify a subset of records associated with the plurality of child data objects for each of the plurality of root data objects that are not stored on the one or more computing devices; and
transmitting a request to the database to retrieve the identified subset of records associated with the plurality of child data objects of the plurality of root data objects.

10. The method of claim 1, wherein transmitting the request comprises transmitting the request to a database server via a computer network.

11. A system, comprising:
a database; and
a server comprising:
a loaded child record table having entries that identify root data objects of different hierarchical data structures and which database records for child data objects of the root data objects of the different hierarchical data structures from separate tables of the database are stored on the server,
one or more processors, and
a memory storing instructions that, when executed by the one or more processors, cause the server to perform operations, the operations comprising:
receiving a request identifying a plurality of parent data records, wherein the plurality of parent data records are roots of structured data objects comprising a plurality of child data records;
determining, using the loaded child record table, which of the plurality of child data records is stored on the server for the plurality of parent data records;
transmitting a request to the database, comprising a plurality of queries for a subset of the plurality of child data records that are not stored on the server;
receiving the subset of the plurality of child data records that are not stored on the server from the database; and
populating the structured data objects using the plurality of parent data records and the subset of the plurality of child data records received from the database.

12. The system of claim 11, wherein the database comprises a plurality of tables in which the plurality of child data records are stored.

13. The system of claim 11, wherein:

the determining using the loaded child record table comprises, for a parent data record, of the plurality of parent data records:
  determining that a first child data record of the parent data record is stored in the server,
  determining that a second child data record of the parent data record is not stored in the server; and
  the transmitting the request comprises:
    including a query for the second child data record in the request, and
    omitting a query for the first child data record from the request.

14. The system of claim 11, wherein the populating the structured data objects further comprises:
  populating the structured data objects using the plurality of parent data records, the plurality of child data records received from the database, and a plurality of child data records stored on the server.

15. The system of claim 11, wherein:
  the determining comprises using the loaded child record table to determine that a request for one of the plurality of child data records was previously transmitted to the database; and
  the transmitting the request to the database comprises omitting a query for the one of the plurality of child data records from the request.

16. The system of claim 11, wherein the operations further comprise:
  storing the subset of the plurality of child data records on the server; and
  adding entries to the loaded child record table for the subset of the plurality of child data records.

17. One or more computer-readable storage media storing instructions that, when executed by one or more processors, cause the one or more processors to perform operations, the operations comprising:
  analyzing a hierarchical data structure to identify a plurality of child data objects of a root data object of the hierarchical data structure, wherein the plurality of child data objects are associated with records stored in separate tables of a database;
  determining that a plurality of database records associated with the plurality of child data objects have not been received from a database, the determining comprising searching within a loaded child record table having entries that identify root data objects of different hierarchical data structures and which database records for child data objects of the root data objects of the different hierarchical data structures from the separate tables of the database are cached;
  generating a database request comprising a plurality of database queries for the plurality of database records associated with the plurality of child data objects;
  transmitting the generated database request to a database;
  receiving the plurality of database records from the database;
  initializing the plurality of child data objects of the hierarchical data structure using the received plurality of database records; and
  adding entries, associating the received plurality of database records with the plurality of child data objects, to the loaded child record table.

18. The one or more computer-readable storage media of claim 17, wherein:
  the determining comprises determining that the plurality of database records are stored in separate tables in the database; and
  the generating the database request comprises generating separate queries to retrieve the plurality of database records from the separate tables in the database.

19. The one or more computer-readable storage media of claim 17, wherein the operations further comprise:
  using the loaded child record table to determine that a request for a database record of the plurality of database records has already been sent to the database; and
  omitting a database query for the database record from the database request.

20. The one or more computer-readable storage media of claim 17, wherein the operations further comprise:
  storing the plurality of database records in a storage medium of a computing device;
  adding entries to the loaded child record table indicating that the plurality of database records have been stored;
  asynchronously inspecting the loaded child record table to determine that the entries have been added to the loaded child record table; and
  responsive to the determining, initializing the plurality of child data objects using the stored plurality of database records.

* * * * *